United States Patent
Christensen et al.

(10) Patent No.: US 9,358,479 B2
(45) Date of Patent: Jun. 7, 2016

(54) DIABATIC DISTILLATION WITH VAPOR RECOMPRESSION

(71) Applicant: Ibus Innovation A/S, Ålsgårde (DK)

(72) Inventors: Børge Holm Christensen, Ålsgårde (DK); Lena Holm Christensen, Helsingør (DK); Lars Schønfeldt, Helsingør (DK)

(73) Assignee: IBUS Innovation A/S, Ålsgårde (DK)

( * ) Notice: Subject to any disclaimer, the term of this patent is extended or adjusted under 35 U.S.C. 154(b) by 0 days.

(21) Appl. No.: 14/414,390

(22) PCT Filed: Jul. 12, 2013

(86) PCT No.: PCT/DK2013/050238
§ 371 (c)(1),
(2) Date: Jan. 12, 2015

(87) PCT Pub. No.: WO2014/012554
PCT Pub. Date: Jan. 23, 2014

(65) Prior Publication Data
US 2015/0190729 A1     Jul. 9, 2015

(30) Foreign Application Priority Data
Jul. 16, 2012   (DK) .................................. 2012 70429

(51) Int. Cl.
*B01D 3/38*     (2006.01)
*B01D 3/00*     (2006.01)
(Continued)

(52) U.S. Cl.
CPC ................ *B01D 3/007* (2013.01); *B01D 1/223* (2013.01); *B01D 1/28* (2013.01); *B01D 1/284* (2013.01); *B01D 3/38* (2013.01); *B01D 5/006* (2013.01); *B01D 5/0036* (2013.01)

(58) Field of Classification Search
CPC .......... B01D 1/223; B01D 1/28; B01D 1/284; B01D 3/007; B01D 3/38; B01D 5/0036; B01D 5/006
See application file for complete search history.

(56) References Cited

U.S. PATENT DOCUMENTS 2,890,155 A * 6/1959 Bueche ........................... 203/89
2,894,879 A * 7/1959 Hickman ......................... 203/27
(Continued)

FOREIGN PATENT DOCUMENTS

DE     10 2009 031 246 A1     8/2010

OTHER PUBLICATIONS

International Preliminary Report on Patentability dated Feb. 3, 2015 received in corresponding International Patent Application No. PCT/DK2013/050238.

(Continued)

*Primary Examiner* — Renee E Robinson
*Assistant Examiner* — Jonathan Miller
(74) *Attorney, Agent, or Firm* — Knobbe, Martens, Olson & Bear, LLP

(57) ABSTRACT

An apparatus for heat-integrated distillation comprising an evaporation chamber (1) with an inlet for feed, an outlet 6 for vapor and an outlet (9) for remnants and a condensation chamber (2) divided into a number consecutive sections (2.1; 2.2; 2.3). The apparatus further, comprises a wall (3) separating the evaporation chamber (1) from the condensation chamber (2), and a compressor (10, 13, 16) for each section of the condensation chamber, at first compressor (10) being arranged in a line connecting the evaporation chamber (1) and the first section (2.1) if the condensation chamber (1) and the additional compressors (13, 16) being arranged in respective lines connecting consecutive sections.

17 Claims, 6 Drawing Sheets

(51) Int. Cl.
  *B01D 5/00* (2006.01)
  *B01D 1/28* (2006.01)
  *B01D 1/22* (2006.01)

(56) References Cited

U.S. PATENT DOCUMENTS

| | | | |
|---|---|---|---|
| 2,993,842 A * | 7/1961 | Smith | 560/78 |
| 3,423,293 A * | 1/1969 | Holden | 202/172 |
| 3,472,304 A * | 10/1969 | Evkin | 159/6.1 |
| 3,486,743 A * | 12/1969 | Todd | 261/89 |
| 3,947,146 A | 3/1976 | Schuster | |
| 4,025,398 A | 5/1977 | Haselden | |
| 4,284,480 A | 8/1981 | Sterlini | |
| 4,575,405 A * | 3/1986 | Sterlini | 203/24 |
| 5,395,483 A * | 3/1995 | Al-Hawaj | 159/2.3 |
| 5,409,576 A * | 4/1995 | Tleimat | 202/174 |
| 5,435,436 A | 7/1995 | Manley et al. | |
| 6,261,419 B1 | 7/2001 | Zebuhr | |
| 2009/0114524 A1 | 5/2009 | Sechrist | |

OTHER PUBLICATIONS

International Search Report for PCT/DK2013/050238 dated Sep. 16, 2013.

* cited by examiner

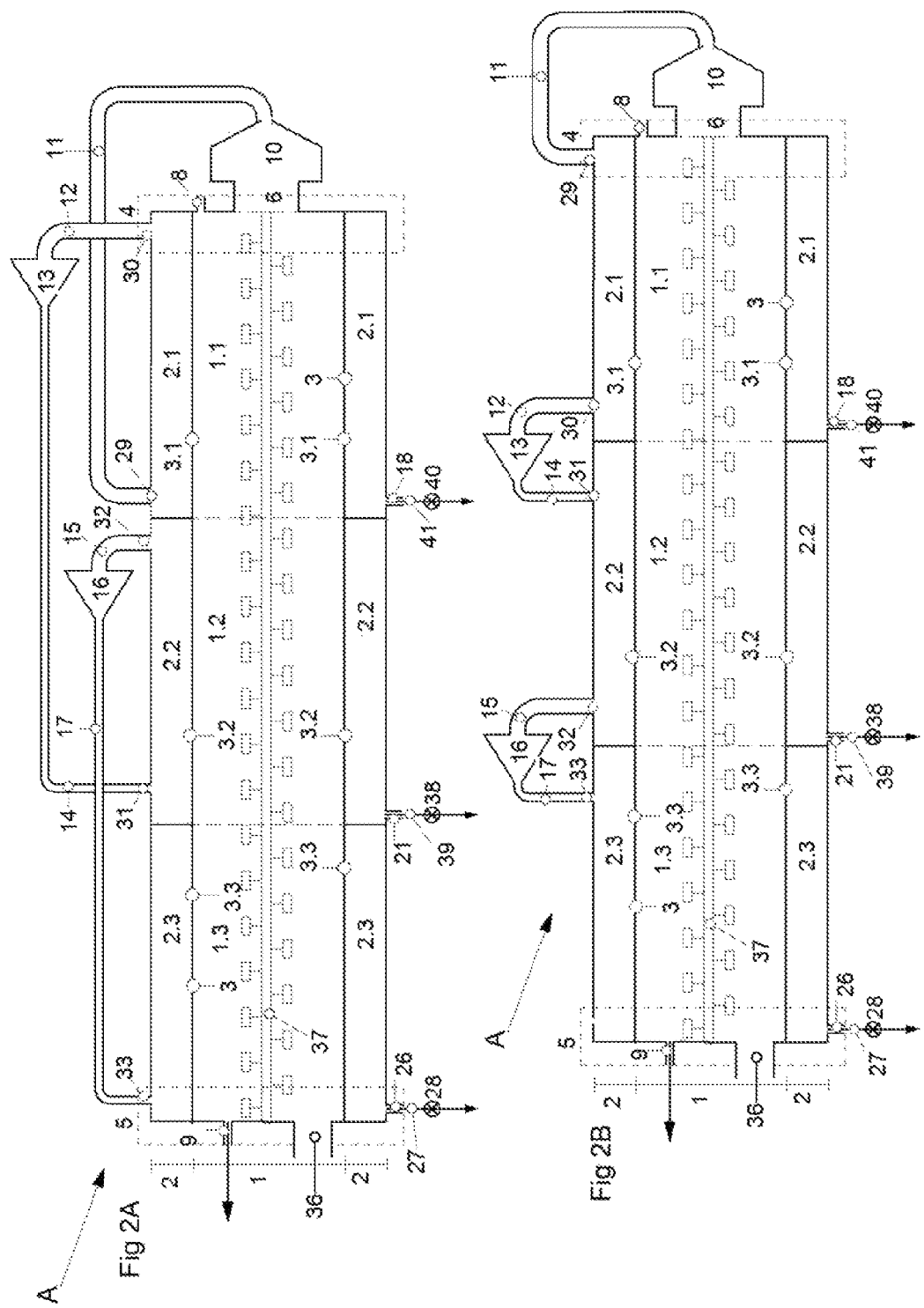

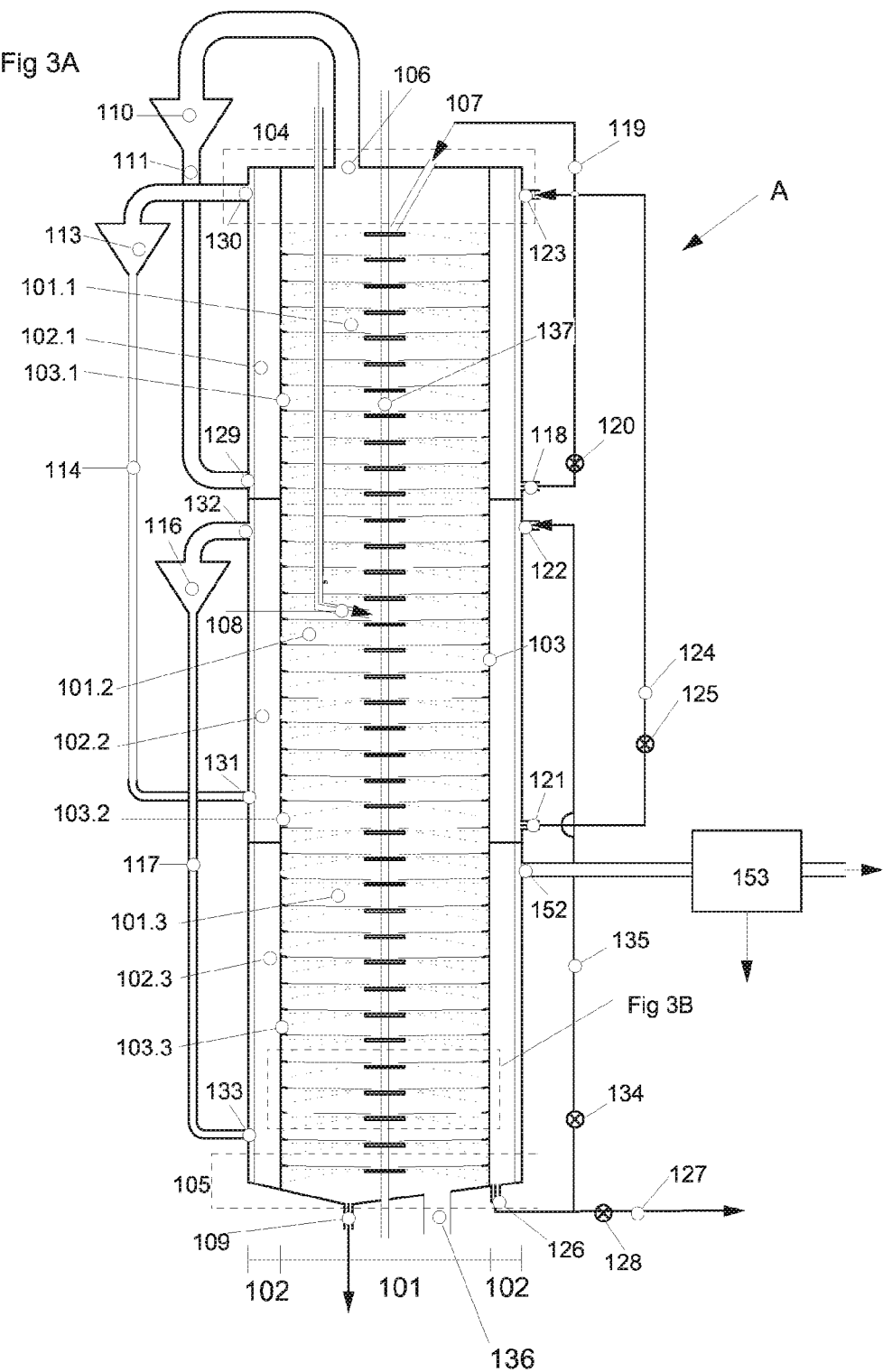

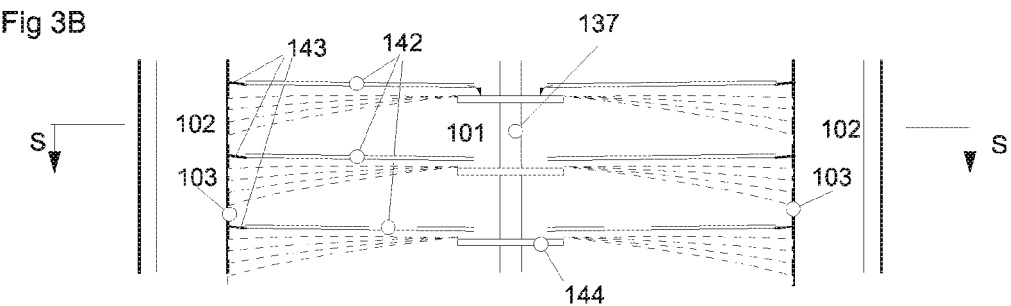
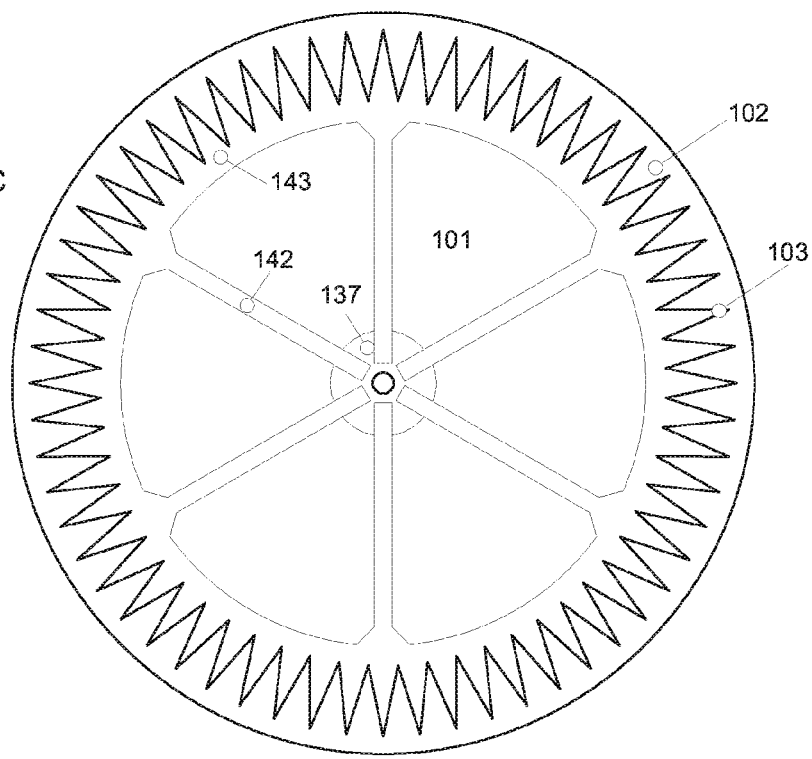

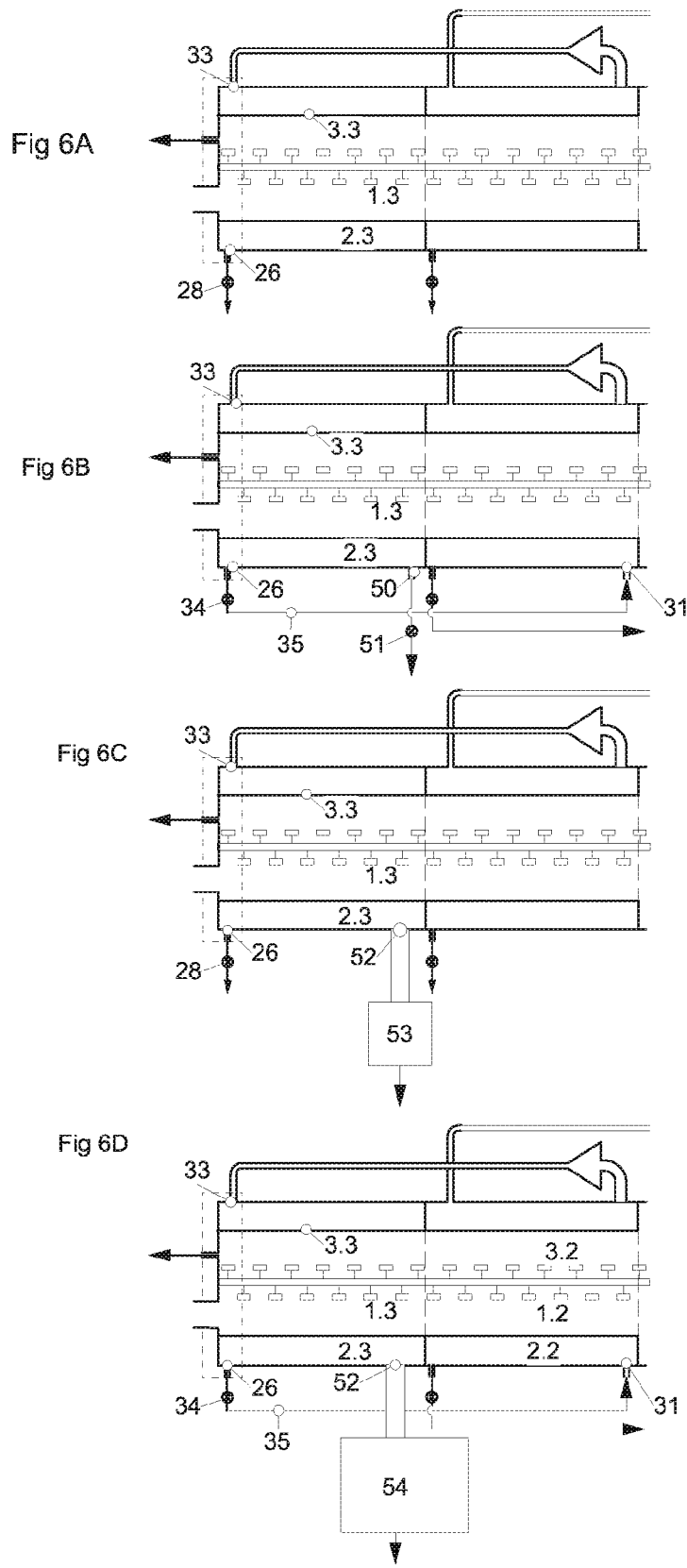

DIABATIC DISTILLATION WITH VAPOR RECOMPRESSION

CROSS REFERENCE TO RELATED APPLICATIONS

This application is a U.S. National Phase Application of PCT International Application Number PCT/DK2013/050238, filed on Jul. 12, 2013, designating the United States of America and published in the English language, which is an International Application of and claims the benefit of priority to Danish Patent Application No. PA 2012 70429, filed on Jul. 16, 2012. The disclosures of the above-referenced applications are hereby expressly incorporated by reference in their entireties.

TECHNICAL FIELD

The invention relates to a method and apparatus for continuous diabatic distillation with vapor recompression comprising an evaporation chamber and a condensation chamber separated by a common heat transfer wall through which heat of condensation is transmitted from the condensation chamber to the evaporation chamber, wherein the main heat supply for the evaporation process during steady state operation derives from condensation of compressed vapor.

BACKGROUND ART

It is well known that distillation processes are very energy-consuming requiring about 5% of the global energy production. When fossil fuels are used as energy source, the sustainability of e.g. bioethanol production is challenged. Huge efforts have been made to reduce the energy consumption of distillation, and substantial reductions have been achieved by multistage distillation, but in order to achieve further substantial reductions, a new approach is needed.

Diabatic operation represents a promising new approach for energy efficient distillation.

In this context diabatic means that heat supply and removal take place through the common chamber walls.

PRIOR ART

U.S. Pat. No. 7,972,423 B2 (Jensen) discloses a diabatic distillation process by which the horizontal stripping/evaporation chamber and the horizontal rectification/condensation chamber are placed side by side separated by a common heat transmission wall. The vapor generated in the stripping chamber is compressed and transferred to the rectification chamber in a way ensuring that the vapor in the two chambers moves in the same direction, whereby the temperature difference between the two sides of the heat transmission wall will be almost constant over the whole length of the wall. Thereby, the outlet for the low boiling component is placed in the opposite end than the outlet for the high boiling component.

U.S. Pat. No. 5,783,047 (Ado) discloses a heat-integrated distillation column (HIDIC) comprising a vertical multitube rectification/condensation unit surrounded by a vertical stripping/evaporation shell, where the wall of each of the multitubes is used as heat transmission wall. Compressed vapor from the column top of the stripping section is supplied to the column bottom of the rectification section ensuring that the vapor in the two sections moves in the same direction. In order to avoid too high vapor velocity, the cross-sectional area of the stripping section is larger in the top of the column than in the bottom, and the cross sectional area of the rectification section is smaller in the top than in the bottom. Also, U.S. Pat. No. 5,783,047 describes that the outlet for the low boiling component is located in the opposite end than the high boiling component.

EP 1380328 (Ado) discloses a heat-integrated distillation column (HIDIC) comprising a vertical multitube rectification/condensation unit surrounded by a vertical stripping/evaporation shell similar to U.S. Pat. No. 5,783,047. By this invention, it is the object of the invention to save energy by reducing the amount of vapor which has to be compressed by the compressor. This is achieved by heating the feed before it is introduced into the stripping section and leading the steam generated in the heat exchanger directly to the rectification section circumventing the compressor. Also, EP 1380328 describes that the outlet for the low boiling component is located in the opposite end than the high boiling component.

US 2007/0251679 A1 discloses an internal heat exchange-type distillation column comprising an outermost heat exchange section 4, an intermediate section 3 and an innermost heat exchange section 2, the outermost and the innermost heat exchange sections communicating with each other through at least one vapor inlet port 71 and at least one vapor outlet port 72. The outermost heat exchange section and the innermost heat exchange section can together be a rectifying section and the intermediate section a stripping section.

The outermost heat exchange section i.e the outermost part of the rectifying section 4, can be made up of a plurality of chambers 4a, see FIGS. 3 and 5. Each chamber of the outermost heat exchange section is provided with a vapor inlet port 71 from and a vapor outlet port 72 to the innermost heat exchange section. In other words, the chambers 4a are communicating with each other through the innermost heat exchange section of the rectifying section. A channel is formed in each chamber having a spiral shape or a shape resembling a spiral shape between the vapor inlet and outlet port as shown in FIGS. 2A-2B. Thus, the chambers are nor pressure-tightly separated from each other, and no pressure-increasing means, such as a compressor, is provided between subsequent chambers.

All prior art has the disadvantage that the energy saving has not been sufficient for the new technologies to penetrate the market. By distillations with a relatively high difference in boiling point temperature, the compressor of the prior art will operate at a relatively low COP (coefficient of performance) because of the high compression ratio needed to increase the temperature in the rectification/condensation unit to a level over that of the stripping/evaporation shell in order to obtain an efficient heat transmission.

The two inventions by Ado have the disadvantage that the stripper is only suited for processing liquids with low viscosity and no solid particles. Many liquids for distillation have high viscosity or contain some particles.

DISCLOSURE OF THE INVENTION

It is the goal of the invention to provide a method and apparatus for diabatic distillation with vapor recompression with lower energy consumption than the prior art.

It is a further goal of one embodiment of the invention to provide an apparatus and method where the evaporation chamber can operate with viscous liquids and liquids with a high content of solids.

The apparatus according to the invention for heat integrated distillation providing a distillate being a vapor and/or a liquid comprises:

a. an evaporation chamber with an inlet for feed, an outlet for vapor at a first end of the chamber, said end being a low temperature end, and an outlet for remnants—at a second opposite end, being a high temperature end, b. a condensation chamber divided into a number of at least two consecutive and pressure-tightly separated sections including a first and a last section, where the first condensation section is placed closest to the low temperature end and the last condensation section is placed closest to the high temperature end, each condensation section having an inlet for compressed vapor and an outlet for not condensed vapor, with the optional exception of the last condensation section, and an outlet for condensate from each section, c. heat transmission wall or walls separating the evaporation chamber pressure-tightly from the condensation chamber, d. a pressure-increasing means, having a high and a low pressure side, such as a compressor for each section of the condensation chamber, a first pressure increasing means, such as a first compressor being on its low pressure side, i.e. inlet side, connected to the vapor outlet at the low temperature end of the evaporating chamber and on its high pressure, i.e. outlet side, connected to the inlet to the first section of the condensation chamber, and a second pressure increasing means, such as a second compressor being on its low pressure side, i.e. inlet side, connected to the vapor outlet of the first section and on its high pressure side, i.e. outlet side, connected to the inlet to the second section of the condensation chamber, the second section being placed consecutive to the first section and closer to the high temperature end (5) of the evaporation chamber.

Embodiments of the apparatus are defined in the dependent claims.

The method according to the invention for heat integrated distillation providing a distillate being a vapor and/or a liquid is carried out by means of an apparatus comprising an evaporation chamber and a condensation chamber, said chambers being pressure tightly separated by means of a common heat transfer wall, said evaporation chamber having a low pressure end and a high pressure end and said condensation chamber being divided into a number of at least two consecutive and pressure tightly separated sections including a first and a last section, the first condensation section being placed closest to the low temperature end and the last condensation section being placed closest to the high temperature end, said method comprising the steps of:

a. supplying a liquid feed, comprising at least two liquids with different boiling points to the evaporation chamber through the feed inlet, b. bringing said liquid into contact with said heat transmission wall, whereby the temperature of the liquid is increased to a level, where practically all of the liquid with the lowest boiling point will evaporate together with some of the liquid, c. removing the generated vapor from the evaporation chamber through a vapor outlet in a first part thereof in the low temperature end, d. compressing said vapor so as to increase the pressure thereof and increase the temperature thereof to at least 1° K. above the highest temperature in a low temperature part of the evaporation chamber, corresponding to, i.e. separated from, the first condensation section in the condensation chamber (2) by a part of the heat transmission wall, e. introducing said compressed vapor into the first section of the condensation chamber, whereby a part of the compressed vapor will condense on a part of the heat transmission wall of the first condensation section, and heat will be transmitted into the corresponding part of the evaporation chamber, f. from each of the condensation sections except the last section removing the uncondensed vapor, compression of the removed uncondensed vapor so as to increase the pressure thereof and increase the temperature thereof to at least 1 K above the highest temperature in a next part of the evaporation chamber corresponding to, i.e. separated from, a next section of the condensation chamber by a part of the heat transmission wall and introducing the compressed vapor into the next section of the chamber, whereby a part of the compressed vapor will condense on a part of the heat transmission wall of the next condensation section and heat will be transmitted into the corresponding part of the evaporation chamber 1.

g. removing condensate from the condensation chamber sections so as to be used as reflux or distillate or a combination of the two, distillate being removed from at least one of the sections, preferably at least the last section.

The present invention differs especially from prior art in that the condensation chamber is divided into two or more pressure tightly separated sections being connected by means of a pressure-increasing means, such as a compressor between a vapor outlet of a first section and a vapor inlet of a subsequent section so as to increase the pressure and thereby the temperature of the subsequent chamber section. The vapor in the condensation chambers is thereby by means of the pressure-increasing means moved in the opposite direction of the vapor in the evaporation chamber. This is contrary to prior art where the vapor moves in the same direction in the evaporation and the condensation chamber.

By the present invention, the advantage is obtained that each pressure-increasing means such as the compressor does not need to elevate the pressure of the vapor as much as a single compressor used in prior art where the vapor has to be compressed to achieve a temperature higher than the temperature in the high temperature end of evaporation chamber. Thereby the energy consumption is lower than in prior art apparatuses and methods The apparatus and method of the invention are particularly suited for distillation of mixtures of liquids, with a relative high difference in boiling points between the most volatile liquid and the least volatile liquid, such as e.g. water and ethanol with a difference in boiling points of approximately 20 K.

BRIEF DESCRIPTION OF THE DRAWINGS

The invention is described in greater details in the following with reference to embodiments and the accompanying drawings, in which FIG. 2A is a diagrammatic view of a second embodiment of the apparatus being slightly modified relative to the first embodiment shown in FIG. 1, FIG. 2B is a diagrammatic view of a third embodiment of the apparatus being slightly modified relative to the embodiment shown in FIG. 2A, FIG. 3A is a diagrammatic view of a fourth embodiment of the apparatus according to the invention having essentially vertical axis, FIG. 3B is a diagrammatic view of a portion of the rotor and the heat transmission wall of the apparatus shown in FIG. 3A, FIG. 3C is a sectional view along the line S-S in FIG. 3B, FIG. 6A-6D are diagrammatic views of the last condensation section being provided with different outlets and connected to different equipment.

DETAILED DESCRIPTION

Figure 1:
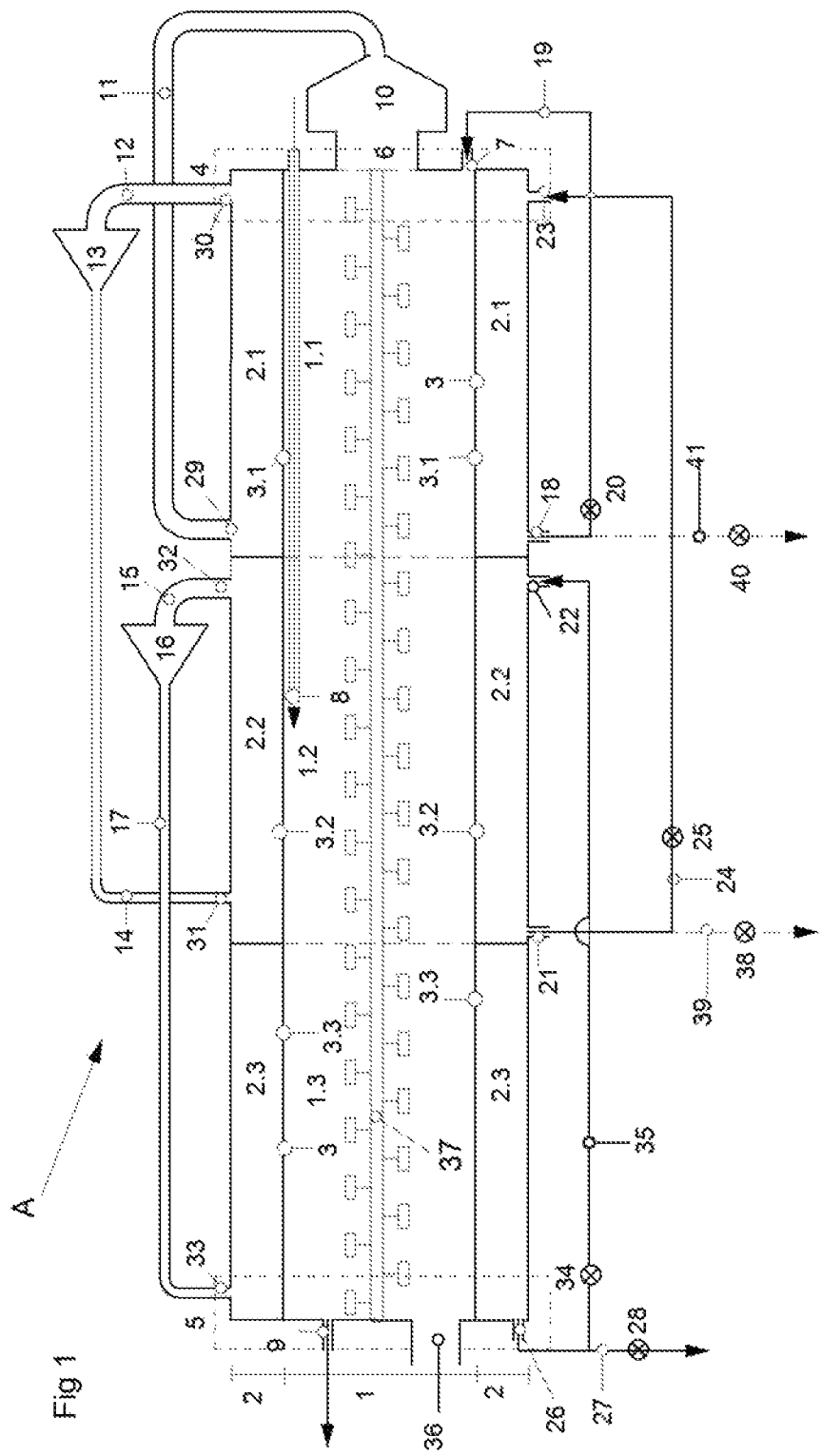
FIG. 1 is a diagrammatic view of a first embodiment of the apparatus according to the invention shown as having an essentially horizontal axis.

As shown in FIGS. 1 and 2, the apparatus according to the invention comprises:
- at least one stripping/evaporation chamber 1.
- At least one rectification/condensation chamber 2, said condensation chamber being pressure-tightly divided in a least two sections 2.1; 2.2; 2.3.
- A common heat transmission wall 3 pressure-tightly separating the evaporation chamber 1 from the condensation chamber.
- At least two compressors 10; 13, one for each section 2.1; 2.2 of the condensation chamber 2.

Typically, the stripping/evaporation chamber 1 will be equipped with an inlet for reflux 7 in one end being the low temperature end 4, an outlet for remnants 9 in the opposite end being the high temperature end 5, and an inlet for feed 8 between the inlet for reflux 7 and the outlet for remnants 9. By ethanol recovery from a fermentation broth, the process taking place between the feed inlet 8 and the remnants outlet 9 will normally be referred to as a stripping process because the ethanol is removed from the feed in this part, named the stripper. Between the reflux inlet 7 and the feed inlet 8, the concentration of ethanol in the vapor from the stripper will increase which is usually referred to as rectification or enrichment. However, evaporation will take place in the entire length of the chamber, and it will therefore be referred to as evaporation chamber 1.

According to the invention, further rectification will take place by stepwise condensation in at least two sections with different pressures which will be referred to as condensation chamber 2

Each condensation section 2.1; 2.2; 2.3 is by means of a corresponding part of the heat transmission wall 3.1; 3.2; 3.3 separated from a corresponding part of the evaporation chamber (1.1; 1.2;1.3) which are placed at the same distance from the ends of the apparatus as the condensation section and have the same length as the condensation section.

As mentioned previously and as it appears from the embodiments shown in FIGS. 1 and 2, the evaporation chamber 1 comprises an inlet 7 for reflux (condensate from the vapor generated in the evaporation chamber) and an outlet for vapor 6 and an outlet for remnants 9. The evaporation chamber 1 also comprises an inlet for feed 8 which is situated between the inlet for reflux 7 and the outlet for remnants 9. Additionally the evaporation chamber comprises a steam inlet 36 at the high temperature end 5 of the apparatus A and a rotor 37 extending essentially over the entire length of the evaporation chamber. The rotor is driven to rotation by means of a not shown motor and adapted to spray or throw liquid in the evaporation chamber against the heat transmission wall 3 in order to provide an evaporation of the liquid by means of the condensation heat of the wall. The steam inlet is especially used in the start-up phase in order to establish steady state conditions.

During steady state continuous operation, there will be a temperature difference between the two ends of the evaporation chamber 1. The temperature in the end with the inlet for reflux 7 will be lower than the temperature in the end with the outlet for remnants 9. In the following, the end with the inlet for reflux 7 will be referred to as the low temperature end 4, and the end with the outlet for remnants 9 will be referred to as the high temperature end 5.

During continuous operation at steady state conditions, all the vapor generated in the evaporation chamber 1 will be let out through the vapor outlet 6 and compressed by a first compressor 10 and directed through the tube 11 and the vapor inlet 29 into the first condensation section 2.1 with increased pressure and condensation temperature, where a part of the vapor will condense on the heat transmission wall part 3.1 which acts as a cooling surface on the rectifier side. The uncondensed vapor from condensation section 2.1 will be removed through the vapor outlet 30 and the tube 12, compressed with a second compressor 13 to increase pressure and condensation temperature further and directed into the second condensation section 2.2 through the tube 14 and the vapor inlet 31. If the second condensation section 2.2 is not the last condensation section, a part of the vapor will condense on the heat transmission wall part 3.2, and uncondensed vapor will be removed through the vapor outlet 32 and the tube 15 and further compressed in a third compressor 16 and directed to the next condensation section 2.3, the tube 17 and the vapor inlet 33. This will be repeated until the last condensation section which, in FIG. 1, is also the third condensation section 2.3. In the last condensation section 2.3, all the vapor should ideally condense on the heat transmission wall part 3.3, but it will often be advantageous to let a small part of the vapor continue to an external trim condenser (not shown in FIGS. 1 and 2) removing and condensing vapor in order to gain better control over the process. The condensation sections will be placed so that the first condensation section 2.1, which has the lowest temperature, is closest, preferably aligned with the low temperature end 4 of the evaporation chamber, and the next condensation section 2.2 is closer to the high temperature end and next to the first condensation section 2.1 and so forth until the last condensation section which is closest to and preferably aligned with the high temperature end 5 of the evaporation chamber.

The condensate from condensation section 2.1 will be removed through the liquid outlet 18 and returned to the evaporation chamber through the tube 19 and the inlet for reflux/condensate 7. The flow of the liquid is controlled by the flow controller 20. A flow controller in this context controls the flow of a liquid from a higher to a lower pressure. It should however be noted that a flow controller could also control the flow from a lower to a higher pressure. The condensate from the second condensation section 2.2 will be let out through the liquid outlet 21, and in cases where the second condensation section is not the last condensation section, the condensate will be transferred to the first condensation section 2.1 through the tube 24 and the liquid inlet 23, whereby the flow will be controlled by the flow controller 25. The condensate from the third condensation section 2.3 is let out through the liquid outlet 26, and in cases where the third condensation section 2.3 is also the last condensation section, all or a part of the condensate is the distillate which will be let out through the tube 27, whereby the flow will be controlled by the flow controller 28. All or a part of the condensate from the third section can be returned to the second condensation section 2.2 as reflux through the tube 35 and the liquid inlet 22, where the flow will be regulated by the flow controller 34.

As indicated in Fig .1, a part of or all the condensate in condensation section 2.2 may be let out through the tube 39, the flow being controlled by the controller 38. Correspondently a part of or all the condensate in the condensation section 2.1 can be let out through the tube 41, the flow being controlled by the controller 40.

The second embodiment of the apparatus according to the invention shown in FIG. 2A is identical to that shown in FIG. 1, apart from the fact that there are not provided any tubes for reflux from the last condensation section 2.3 to the second section 2.2, from the second section 2.2 to the first section 2.1, and from the first section 2.1 to the evaporation chamber 1. All the condensate from each condensation chamber section 2.1, 2.2, 2.3 is taken out through the respective liquid outlets 18; 21; 26 and tubes 41; 39; 27, as indicated as a possibility above. This also means, that the liquid inlet in the low temperature end 4 is the inlet 8 for feed and not the inlet 7 for reflux.

Depending on the desired end product, energy prices etc., the last condensation section 2.3 can be equipped and operated in various ways, for example, the last condensation section can be equipped with:

- One liquid outlet 26 and no vapor outlet. All the vapor condenses in the last condensation section 2.3 and the condensate is the product (distillate), see FIG. 6A.
- Two liquid outlets. One liquid outlet 26 is closest to the high temperature end 5 of the evaporation chamber and is connected to a tube 35 equipped with a flow controller 34 connecting it to a liquid inlet 31 in the previous condensation section 2.2. The condensate from this outlet has the lowest concentration of the liquid with the lowest boiling point. The other liquid outlet 50 is closest to the low temperature end 4 of the evaporation chamber and is the outlet for distillate. The flow is controlled by the flow controller 51. The condensate from this liquid outlet has the lowest concentration of the liquid with the highest boiling point, see FIG. 6B.
- Vapor outlet 52 connected to a trim condenser 53 and one (FIG. 6A) or two (FIG. 6B) liquid outlets. A part of the product derives from the liquid outlet for distillate and a part of the product derives from vapor taken out through the vapor outlet 52 which is condensed in the trim condenser 53, see FIG. 6C.
- Vapor outlet 52 and a liquid outlet 26 connected to the previous condensation section 2.2. All of the distillate is taken out as vapor, and the vapor can either be condensed in an external condenser or transferred to a dehydration unit 54, see FIG. 6D.

If the distillation is a fractional distillation, where the feed is separated according to boiling point ranges, as it is e.g. done in the petrochemical industry, a product may be taken out from each condensation section. The product can either be all of the condensate from a condensation unit, or a part of the condensate can be returned to the previous condensation section as reflux. The condensate can either be taken out through one liquid outlet and separated in two streams, one product stream and one reflux stream, or the product can be taken out of a liquid outlet closest to the low temperature end of the evaporation chamber and the reflux can be taken out of another liquid outlet closest to the high temperature end of the evaporation chamber.

As the vapor condenses on the rectifier side of the heat transmission wall 3, heat will be transferred through the heat transmission wall 3 into the evaporation chamber 1, where it will cause a part of the liquid to evaporate. The condensation heat from the condensation chamber 2 will be the main heat source for the evaporation process, but an external heat supply will be used in cases for start-up and process control. This trim heat supply may e.g. be supplied by means of a reboiler or direct steam injection. The main energy supply for the distillation process will be the energy supply for the compressors which increase the pressure and temperature of the vapor. Typically, the energy supply for the trim heat supply will be steam from another process or from a steam generator.

Different sections of the condensation chamber 2 have different pressure and different temperature. First, the vapor is led to the section 2.1 with the lowest pressure and temperature and then stepwise compressed so that uncondensed vapor from one condensation section is compressed. This will increase the pressure and temperature so that the pressure and temperature is higher in the next condensation section.

Since the first section of the condensation chamber is at the low temperature end, where also the vapor outlet from the evaporation chamber is situated, and the last section of the condensation chamber is at the high temperature end, where also the remnants outlet is situated, the vapor in the evaporation chamber will move in the opposite direction than the vapor in the condensation chamber by means of the compressors. This is contrary to the prior art, where the vapor in the evaporation and the condensation chamber moves in the same direction. The advantage of this new approach is that although it demands more compressors than the prior art, each compressor does not have to elevate the pressure as much as the one compressor used in the prior art. This renders it possible to use cheaper compressors with a higher COP. Another advantage is that only the first compressor has to elevate the pressure of all the vapor. This means that only a part of the vapor must be compressed to achieve a temperature which is higher than the temperature of the high temperature end of the stripper. This is different to the prior art, where all the vapor must be compressed to achieve a temperature which is higher than the temperature in the high temperature end of the evaporation chamber.

The different parts of the evaporation chamber have the same pressure but different temperature. The part with the lowest temperature is corresponding to the condensations section with the lowest pressure and temperature. The part with the highest temperature is corresponding to the rectification section with the highest temperature and pressure.

This means that different parts of the heat transmission wall will have a different pressure difference between the evaporation side and the condensation side.

As shown in FIGS. 1 and 2A in a preferred embodiment, the vapor inlets 29; 31; 33 for the condensation sections are placed in the high temperature end of each section, and the vapor outlets 30; 32; are placed in the low temperature end of each section (there may not be a vapor outlet in the last section). The liquid outlets 18; 21; and 26 are placed in the high temperature end of each section, and the liquid inlets 23; 22 are placed in the low temperature end. This embodiment makes it possible to provide counter current liquid vapor contact within the condensation chamber sections with the liquid moving towards a higher temperature, and the vapor moving towards a lower temperature which is optimal to achieve enrichment of the vapor. The movement of the vapor towards a lower temperature will, however, only be inside each section. The movement of the vapor from the first condensation section to the last condensation section will result in the vapor moving from a lower temperature towards a higher temperature which is the opposite direction of the movement in the evaporation chamber.

In the evaporation chamber 1, the amount of vapor will be largest in the low temperature end which is also where the vapor outlet is located, and in the condensation chamber, the amount of vapor will be largest in the section with the lowest temperature. High vapor velocity can be avoided by providing a larger cross section area of both the evaporation chamber 1 and the condensation chamber in the low temperature end. This can e.g. be achieved by separating the evaporation chamber in more than one section. This makes it possible to establish two parallel sections of the evaporation and condensation sections with the lowest temperature.

FIG. 2B shows a third embodiment which only differs from that shown in FIG. 2A in that the vapor inlet 29; 31; 33 to the respective condensation sections 2.1; 2.2; 2.3 is placed at the low temperature end thereof and not the high temperature end, and the vapor outlet 30; 32 from the respective condensation sections 2.1; 2.2 is placed at the high temperature end thereof and not the low temperature end.

In an embodiment of the invention, which is preferred when the feed is viscous and which is especially preferred if the feed contains solid particles, the evaporation chamber comprises the previously mentioned rotor creating a spray of liquid which provides the liquid vapor contact in the evaporation chamber. As shown and described in U.S. Pat. No. 7,972,423 B2 (Jensen), the condensation chamber may, however, also surround the evaporation chamber which means that the evaporation chamber is surrounded by the heat transmission wall. A substantial part of the droplets will impinge on the heat transmission wall. This solution for contacting liquid and vapor and contacting liquid and heat transmission wall has several advantages.

The impingement will secure good contact between the liquid and the heat transmission surface.

The force of the impingement will prevent scaling and fouling on the heat transmission surface.

The impingement will create perturbation in the liquid film on the heat transmission wall which will improve the heat transmission into the liquid film and thereby also through the liquid film into the evaporation chamber. The perturbation also prevents scaling and fouling.

It is possible to minimise inactive space thereby achieving more compact equipment which again will decrease capital and operational costs—particularly when operation at pressures different from ambient pressure (vacuum or elevated pressure) is desired.

The absence of traditional contact devices in the evaporation chamber facilitates maintenance and decreases capital costs.

The rotor can be both horizontal and vertical, each having different advantages and disadvantages.

An embodiment using a rotor with a vertical axis is shown in FIGS. 3A, 3B and 3C. FIG. 3A is a vertical section through the apparatus A, FIG. 3B is an enlarged section of FIG. 3A, and FIG. 3C is a horizontal section along the line S-S in FIG. 3B.

The condensation chamber 102 is surrounding the evaporation chamber 101. The condensation chamber and the evaporation chamber are pressure-tightly separated by the heat transmission wall 103.

The low temperature end 104 will be at the top of the apparatus A and the high temperature end 105 of the apparatus A will be at the bottom.

The rotor 137 is arranged centrally in the evaporation chamber 101 and provided with a plurality of mutually spaced spraying discs 144. Further in the evaporation chamber 101 the heat transmission wall 103 is provided with a plurality of mutually spaced circumferentially extending ring-shaped shelves 143. From each shelf 143 six channels 142 extend radially inwardly like spokes and end slightly above a spraying disc 144. The shelves 143 and the channels 142 extend slightly downwardly as seen from the wall 103 towards the centrally arranged rotor 137.

The feed is introduced through the adjustable feed inlet 108 onto the rotor 137. The liquid is sprayed from the rotor 137 transversely through the evaporation chamber 101 and will impinge on the heat transmission wall 103, where it will receive heat, and a part of the liquid will evaporate. The vapor will always contain a higher concentration of the component with the lowest boiling point than the liquid from which it evaporated. The rest of the liquid will flow down along the heat transmission wall until it reaches a shelf 143, which will collect the liquid. The liquid will flow back to the rotor 137 in the channel 142. In this way, the liquid will be sprayed through the evaporation chamber approximately as many times as the number of shelves and spraying discs in the equipment. Each time the liquid is sprayed, it will move at least one step downwards, toward the high temperature end 105, from where it will be taken out through the liquid outlet 109. This liquid, usually referred to as remnants, will contain practically no, or very little, of the liquid with the lowest boiling point.

The vapor generated in the evaporation chamber will be taken out through the vapor outlet 106 and it will be compressed in the compressor 110 in order to increase the temperature to be at least 1 K higher than the highest temperature of the low temperature section, i.e. first section 101.1 of the evaporation chamber 101, and will be let to the vapor inlet 129 of the first condensation section 102.1 through the tube 111. A part of the vapor will condense on the colder first heat transmission wall part 103.1, and the heat of condensation will be transferred to the first evaporation chamber section 101.1. The vapor which has not condensed will be taken out through the vapor outlet 130 and compressed in the compressor 113 to increase the temperature to at least 1 K above the highest temperature in the next evaporation section 101.2 and through the tube 114 and the vapor inlet 131 let to the next condensation section 102.2, where a part of the vapor will condensate on the next heat transmission wall part 103.2 and transfer heat into the next evaporation section 101.2. Uncondensed vapor will be removed through the vapor outlet 132, compressed in the compressor 116 to increase the temperature to at least 1 K above the highest temperature in evaporation section 101.3, led through the tube 117 to the vapor inlet 133 of the last condensation section 102.3, where it will condense on the last heat transmission wall part 103.3 and transfer heat into the last evaporation section 101.3. Uncondensed vapor and incondensable gasses will be taken out through the gas outlet 152 and let to the condenser 153, where the vapor will be condensed and the gasses exhausted.

The condensate from the first condensation section 102.1 will be let out through a liquid outlet 118 at the bottom of the evaporation section and it will be led through the tube 119 to a liquid inlet 107 at the top of the evaporation chamber 101 from where it will be led to the rotor 137. This liquid will usually be referred to as reflux and it will have a higher concentration of the component with the lowest boiling point than the feed. This means that the vapor generated between the liquid inlet 107 and the inlet for feed 108 will have a higher concentration of the component with the lowest boiling point than can be achieved by evaporating the feed. The increase of the content in the vapor of the component with the lowest boiling point by using condensed vapor as reflux is in the distillation industry referred to as strengthening. The flow of the liquid through the tube 119 will be regulated by the flow controller 120.

The condensate from the second condensation section 102.2 will be removed from the bottom of the section through the liquid outlet 121, from where it will be led through the tube 124 to the liquid inlet 123 in the first condensation section 102.1, where it will function as reflux. The flow of the liquid will be regulated by flow controller 125.

The condensate from the last condensation section 102.3 will be taken out through the liquid outlet 126. This liquid is the liquid with the highest concentration of the component with the lowest boiling point. The liquid stream is divided in two streams by means of two flow controllers 128 and 134 or a liquid divider (not shown). One stream is led through the tube 135 to the liquid inlet 122 at the top of condensation section 102.2, where it will function as reflux. The other stream is taken out through the tube 127. This liquid is usually referred to as the distillate or the product in the distillation industry.

The condensation sections 102.1; 102.2 and 102.3 are preferably equipped with contact devices (not shown) like e.g. structural packing, shelves, bubble trays, which is also known from the conventional distillation industry.

The vapor inlets 129; 131 and 133 will usually be placed in the bottom of the condensation chamber sections 102.1; 102.2 and 102.3 and the vapor outlets 130; 132 and 152 will usually be placed in the top of the condensation chamber sections 102.1; 102.2 and 102.3, in order to establish a counter current movement between the liquid moving downwards by gravity and the vapor.

As mentioned the condensation chamber may be equipped with contact devices such as shelves or structural packing. The maintenance of contact devices in the condensation chamber is usually unproblematic since the substances, which increase the viscosity of the feed, and any solid particles will stay in the remnants in the evaporation chamber.

If the rotor is vertical, it will often be an advantage to place the evaporation/rectification sections beside each other, instead of stacking them.

Figure 4:
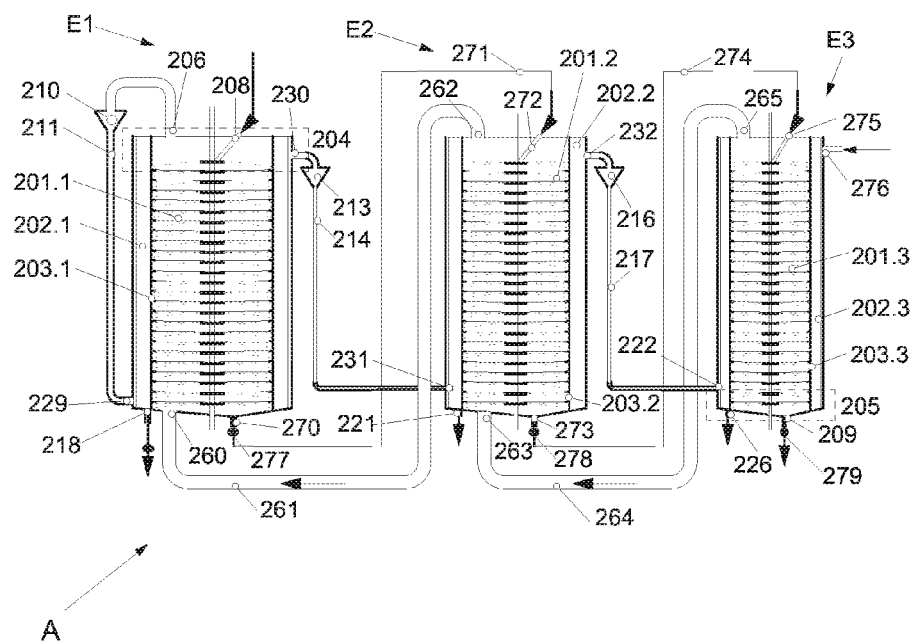
FIG. 4 is a diagrammatic view of a fifth embodiment of the apparatus according to the invention comprising three mutually connected apparatus elements arranged next to each other and each having a vertical arranged axis.

This is illustrated in FIG. 4.

The embodiment illustrated does not use the condensates as reflux, however, it would be possible to use the condensates from the condensation sections 202.1; 202.2 and a part of the condensate from 202.3 as reflux using the same principles described shown in FIGS. 1 and 3A. FIG. 4 further illustrates an embodiment, where the cross section of evaporation and condensation sections with the lowest temperatures is larger than the cross section of the evaporation and condensation sections with the highest temperature.

The apparatus A comprises three elements E1; E2 and E3 which are placed next to each other.

The first element E1 comprises first evaporation section 201.1, first condensation section 202.1 and first heat transmission wall part 203.1. The second element E2 comprises second evaporation section 201.2, second condensation section 202.2 and second heat transmission wall part 203.2. The third and last element E3 comprises third and last evaporation section 201.3, third and last condensation section 202.3 and third and last heat transmission wall part 203.3.

The cross section of both evaporation section and condensation section of E1 is larger than the cross section of the evaporation and condensation sections of E2, which is larger than the cross section of evaporation and condensation section of E3. Evaporation and condensation take place as previously described.

The feed enters the first evaporation section 201.1 through the liquid inlet 208. When the liquid reaches the bottom of this section it will be drained through the liquid outlet 270 and transferred to the liquid inlet 272 in the top of the second evaporation section 201.2 through the tube 271. The liquid will be transported by means of flow controller 277, such as a pump. In the bottom of the second evaporation section 201.2, the liquid will be drained through the liquid outlet 273 and transferred to the liquid inlet 275 in the top of third and last evaporation section 201.3 through the tube 274, whereby the transportation of the liquid is secured by the flow controller 278. When the liquid reaches the bottom, it is drained out through liquid outlet 209. This liquid is usually referred to as remnants or stillage in the distillation industry.

The vapor generated in the third evaporation section of E3, 201.3 is let out from the top through vapor outlet 265 and transferred to the vapor inlet 263 in the bottom of the second evaporation section of E2, 201.2 through the tube 264. The vapor generated in this evaporation section will be let out through the vapor outlet 262 in the top and let through the tube 261 to the vapor inlet in the bottom of the first evaporation section of E1, 201.1. The vapor from this section will be taken out through the vapor outlet 206 in the top of the section, compressed in compressor 210 and transferred to the vapor inlet 229 at the bottom of the first condensation section 202.1 of E1 through the tube 211. The condensate is drained through liquid outlet 218. The uncondensed vapor is let out through vapor outlet 230, compressed by compressor 213 and transferred through tube 214 to the vapor inlet 231 at the bottom of the second condensation section 202.2 of E2. The condensate from this section is drained through liquid outlet 221 and the uncondensed vapor is let out through the vapor outlet 232, compressed in compressor 216 and transferred through tube 217 to the vapor inlet 222 in the bottom of the third condensation section 202.3 of E3. The condensate from this section is drained through liquid outlet 226. The condensation section of E3, 202.3, is equipped with a liquid inlet for liquid 275, whereby injection of liquid, preferably condensate, can be used to decrease the temperature in the condensation chamber with the purpose of trimming the process.

Figure 5:
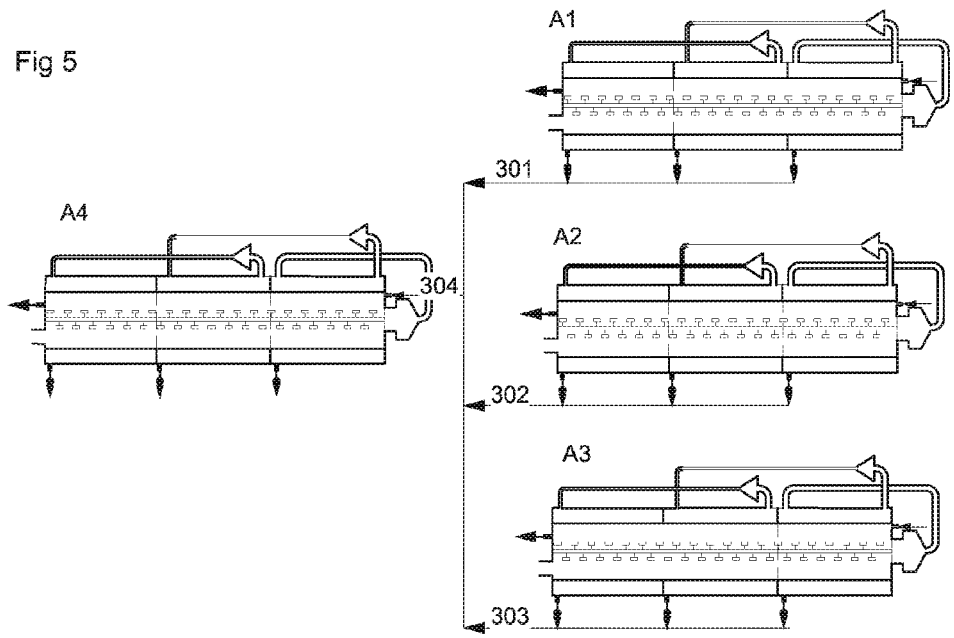
FIG. 5 is a diagrammatic view of an assembly of four apparatuses according to the invention, three apparatuses being arranged in parallel and each connected to a fourth and last apparatus.

Another way to provide a larger capacity where it is needed and avoid either having parts of the equipment which is not efficiently exploited or having too high vapor velocity, is to combine several apparatuses as shown in FIG. 5.

The apparatuses A1; A2 and A3 are receiving a feed stream, and liquid with a higher concentration of the most volatile component than the feed is produced in each of the apparatuses as previously explained. This liquid will be led from each apparatus through the tubes 301; 302 and 303 into the tube 304, which is also the tube for feed to the apparatus A4. By many processes, e.g. ethanol distillation, the content of the component with the highest boiling point is much larger than the component with the lowest boiling point. The typical ethanol concentration in the feed will be 5-10%. Depending on the concentration of ethanol and whether the process is carried out with or without reflux, the volume of the feed entering A4 will only be about 15-30% of the volume of the feed entering A1; A2 and A3.

By liquids with low viscosity, which are free from solids, many variations in the design are possible, but it is crucial that a large heat transmission surface and good contact between the liquid in the evaporation chamber and the heat transmission surface and the vapor in the condensation chamber and the heat transmission surface are provided.

As explained above in the method according to the invention for heat-integrated distillation, where the evaporation chamber and the condensation chamber share a common heat transfer wall separating the evaporation chamber and the condensation chamber pressure tightly from each other:

a. the liquid in the evaporation chamber 1 is moving from the low temperature end 4 towards the high temperature end 5,
b. the vapor in the evaporation chamber is moving from the high temperature end 5 towards the low temperature end 4 in the,
c. the vapor in the condensation chamber 2 is moving from the low temperature end 4 towards the high temperature end 5.

In more details and as explained above, the method according to the invention for heat-integrated distillation provides a distillate being a vapor and/or a liquid by means of an apparatus comprising an evaporation chamber 1 and a condensation chamber 2, said chamber being pressure-tightly separated by means of a common heat transfer wall 3, said evaporation chamber having a low temperature end 4 and a high temperature end 5 and said condensation chamber 2 being divided into a number of at least two consecutive and pressure-tightly separated sections 2.1; 2.2 including a first and a last section, the first condensation section being placed closest to the low temperature end 4 and the last condensation section 2.3 being placed closest to the high temperature end 5, said method comprising the steps of:

a. supplying a liquid feed comprising at least two liquids with different boiling points to the evaporation chamber 1 through the feed inlet 8,
b. bringing said liquid into contact with said heat transmission wall 3, whereby the temperature of the liquid is increased to a level, where at least some of the liquid with the lowest boiling point will evaporate,
c. removing the generated vapor from the evaporation chamber 1 through a vapor outlet 6 in a first part 1.1 thereof in the low temperature end 4,
d. compressing said vapor so as to increase the pressure thereof and increase the temperature thereof to at least 1 K above the highest temperature in a low temperature part 1.1 of the evaporation chamber, corresponding to, i.e. separated from, the first condensation section 2.1 in the condensation chamber 2 by a part of the heat transmission wall 3,
e. Introducing said compressed vapor into the first section of the condensation chamber 2.1, whereby a part of the compressed vapor will condense on a part 3.1 of the heat transmission wall 3 of the first condensation section 2.1 and heat will be transmitted into the corresponding part 1.1 of the evaporation chamber 1,
f. from each of the condensation sections except the last section 2.3, removing the uncondensed vapor, compressing the removed uncondensed vapor so as to increase the pressure thereof and increase the temperature thereof to at least 1 K above the highest temperature in a next part 1.2 of the evaporation chamber 1 corresponding to, i.e. separated from, a next section 2.2 of the condensation chamber 2 by a part of the heat transmission wall and introducing the compressed vapor into the next section 2.2 of the chamber 2, whereby a part of the compressed vapor will condense a part 3.2 of the heat transmission wall of the next condensation section 2.2 and heat will be transmitted into the corresponding part 1.2 of the evaporation chamber 1.
g. removing condensate from the condensation chamber sections so as to be used as a reflux or distillate or a combination of the two, distillate being removed from at least one of the sections, preferably at least the last section 2.3.

LIST OF REFERENCE NUMBERS

A Apparatus
A1 Apparatus
A2 Apparatus
A3 Apparatus
A4 Apparatus
E1 First element
E2 Second element
E3 Third element
1 Evaporation chamber
1.1 First part of evaporation chamber
1.2 Second or next part of evaporation chamber
1.3 Third (last) part of evaporation chamber
2 Condensation chamber
2.1 First condensation section
2.2 Second condensation section
2.3 Third (last) condensation section
3 Heat transmission wall
3.1 First part of heat transmission wall
3.2 Second (next) part of heat transmission wall
3.3 Third (last) part of heat transmission wall
4 Low temperature end
5 High temperature end
6 Vapor outlet
7 Inlet for reflux
8 Inlet for feed
9 Outlet for remnants
10 First compressor
11 Tube
12 Tube
13 Second compressor
14 Tube
15 Tube
16 Third compressor
17 Tube
18 Outlet
19 Tube
20 Flow controller
21 Liquid outlet
22 Liquid inlet
23 Liquid inlet
24 Tube
25 Flow controller
26 Liquid outlet
27 Tube
28 Flow controller
29 Vapor inlet
30 Vapor outlet
31 Vapor inlet
32 Vapor outlet
33 Vapor inlet
34 Flow controller
35 Tube
36 Steam inlet
37 Rotor
38 Flow controller
39 Tube
40 Flow controller
41 Tube
50 Liquid outlet
51 Flow controller
52 Vapor outlet
53 Trim condenser
54 Dehydration unit
101 Evaporation chamber
101.1 First evaporation chamber section
101.2 Second evaporation chamber section
101.3 Third (last) evaporation chamber section
102 Condensation chamber
102.1 First condensation section 102.2 Second condensation section
102.3 Third (last) condensation section
103 Heat transmission wall
103.1 First heat transmission wall part
103.2 Second heat transmission wall part
103.3 Third (last) heat transmission wall part
104 Low temperature end
105 High temperature end
106 Vapor outlet
107 Liquid inlet
108 Feed inlet
109 Liquid outlet
110 Compressor
111 Tube
112
113 Compressor
114 Tube
115
116 Compressor
117 Tube
118 Liquid outlet
119 Tube
120 Flow controller
121 Liquid outlet
122 Liquid inlet
123 Liquid inlet
124 Tube
125 Flow controller
126 Outlet
127 Tube
128 Flow controller
129 Vapor inlet
130 Vapor outlet
131 Vapor inlet
132 Vapor outlet
133 Vapor inlet
134 Flow controller
135 Tube
136
137 Rotor
142 Channels
143 Ring shaped shelves
144 Spraying discs
152 Gas outlet
153 Condenser
201.1 First evaporation section
201.2 Second evaporation section
201.3 Third (last) evaporation section
202.1 First condensation section
202.2 Second condensation section
202.3 Third (last) condensation section
203.1 First heat transmission wall part
203.2 Second heat transmission wall part
203.3 Third (last) heat transmission wall part
206 Vapor outlet
208 Liquid inlet
209 Liquid outlet
210 Compressor
211 Tube
213 Compressor
214 Tube
216 Compressor
217 Tube
218 Liquid outlet
221 Liquid outlet
222 Vapor inlet
226 Liquid inlet
229 Vapor inlet
230 Vapor outlet
231 Vapor inlet
232 Vapor outlet
260 Vapor inlet
261 Tube
262 Vapor outlet
263 Vapor inlet
264 Tube
265 Vapor outlet
270 Liquid outlet
271 Tube
272 Liquid inlet
273 liquid outlet
274 Tube
275 Liquid inlet
277 Flow controller
278 Flow controller
301 Tube
302 Tube
303 Tube
304 Tube

The invention claimed is:

1. An apparatus for heat-integrated distillation providing a distillate being a vapor and/or a liquid, said apparatus comprising:
   a. an evaporation chamber comprising an inlet for a liquid feed comprising at least two liquids with different boiling points, an outlet for a vapor at a low temperature end, and an outlet for remnants at a high temperature end,
   b. a condensation chamber surrounding the evaporation chamber and divided into a number of at least two consecutive and pressure-tightly separated sections including a first and a last section, where the first condensation section is placed closest to the low temperature end and the last condensation section is placed closest to the high temperature end, each condensation section having an inlet for compressed vapor and an outlet for not condensed vapor, with the optional exception of the last condensation section, and an outlet for condensate from each section,
   c. at least one heat transmission wall separating the evaporation chamber-pressure-tightly from the condensation chamber, the evaporation chamber having a rotor for spraying or throwing liquid against the heat transmission wall and connected to a motor for rotating said rotor,
   d. a compressor, having a high and a low pressure side, for each section of the condensation chamber, a first compressor on a low pressure side, or inlet side, connected to the vapor outlet at the low temperature end of the evaporating chamber and on a high pressure side, or outlet side, connected to the inlet to the first section of the condensation chamber, and a second compressor on a low pressure side, or inlet side, connected to the vapor outlet of the first section and on a high pressure side, or outlet side, connected to the inlet to the second section of the condensation chamber, the second section placed consecutive to the first section and proximal to the high temperature end of the evaporation chamber.

2. The apparatus according to claim 1, wherein an outlet for the distillate is provided at least in one of the sections of the condensation chamber.

3. The apparatus according to claim 1, wherein the evaporation chamber is provided with an evaporation chamber inlet for reflux at the low temperature end.

4. The apparatus according to claim 3, wherein each condensation section is provided with a condensation section inlet for reflux with the exception of the last condensation section.

5. The apparatus according to claim 1, wherein the inlet for feed is provided at the low temperature end.

6. The apparatus according to claim 1, wherein the inlet for feed is provided between the low temperature end and the high temperature end.

7. The apparatus according to claim 6, wherein the location of the inlet for feed is adjustable.

8. The apparatus according to claim 3, wherein a tube with a flow controller is provided between a liquid outlet from the first condensation section with a reflux inlet in the low temperature end of the evaporation chamber.

9. The apparatus according to claim 1, wherein the liquid outlet from one condensation section is connected to a liquid inlet in the previous condensation section proximal to the low temperature end by a tube equipped with a flow controller.

10. The apparatus according to claim 1, wherein a second outlet for condensate in the last condensation section is placed proximal to the low temperature end.

11. The apparatus according to claim 1, wherein the outlet for condensate in the last condensation section is placed closest to the high temperature end.

12. The apparatus according to claim 1, wherein an adjustable liquid divider is provided after each outlet for condensate from the condensation chamber sections, said liquid divider being connected to a tube connecting it to the previous section with lower pressure or the evaporation chamber and to a tube connecting it to a product outlet.

13. The apparatus according to claim 1, wherein the high temperature end of the evaporation chamber is equipped with an inlet for steam.

14. The apparatus according to claim 1, wherein the last condensation section is equipped with an outlet for vapor which is connected to a condenser.

15. The apparatus according to claim 1, wherein the evaporation chamber at the low temperature end has a larger total cross section area than the evaporation chamber at the high temperature end.

16. The apparatus according to claim 1, wherein the total cross section area of the condensation section with the lowest temperature is larger than the total cross section area of the condensation section with the highest temperature.

17. A method for heat integrated distillation comprising:
providing an apparatus comprising an evaporation chamber and a condensation chamber surrounding the evaporation chamber, said chambers being pressurized and tightly separated by a common heat transmission wall, said evaporation chamber having a low temperature end and a high temperature end and a feed inlet and being further provided with a rotor for spraying or throwing liquid against the heat transmission wall and being connected to a motor for rotating said rotor and said condensation chamber being divided into a number of at least two consecutive and pressurized tightly separated sections including a first and a last section, the first condensation section being placed proximal to the low temperature end and the last condensation section being placed proximal to the high temperature end;

supplying a liquid feed, comprising at least two liquids with different boiling points to the evaporation chamber through the feed inlet;

bringing said at least two liquids into contact with said heat transmission wall by spraying or throwing the at least two liquids against the heat transmission wall by the rotor, whereby the temperature of the at least two liquids is increased to a level, such that substantially all of the liquid with the lowest boiling point will evaporate together with some of the liquid with a higher boiling point;

removing the generated vapor from the evaporation chamber through a vapor outlet in a first part thereof in the low temperature end;

compressing said vapor so as to increase the pressure thereof and increase the temperature thereof to at least 1 K above the highest temperature in a low temperature part of the evaporation chamber, which is separated from, the first condensation section in the condensation chamber by a part of the heat transmission wall;

introducing said compressed vapor into the first section of the condensation chamber, whereby a part of the compressed vapor will condense on a part of the heat transmission wall of the first condensation section, and heat will be transmitted into the corresponding part of the evaporation chamber, from each of the condensation sections except the last section, removing the uncondensed vapor, compressing the removed uncondensed vapor so as to increase the pressure thereof and increase the temperature thereof to at least 1 K above the highest temperature in a next part of the evaporation chamber, which is separated from, a next section of the condensation chamber by a part of the heat transmission wall and introducing the compressed vapor into the next section of the condensation chamber, whereby a part of the compressed vapor will condense on a part of the heat transmission wall of the next condensation section and heat will be transmitted into the corresponding part of the evaporation chamber; and removing condensate from the condensation chamber sections so as to be used as a reflux or a distillate or a combination of the two, the distillate being removed from at least one of the condensation chamber sections.

* * * * *